United States Patent
Zhu et al.

(10) Patent No.: US 11,788,875 B2
(45) Date of Patent: Oct. 17, 2023

(54) MEASUREMENT PICKUP FOR DETERMINING THE MASS FLOW RATE OF A LIQUID

(71) Applicant: Endress+Hauser Flowtec AG, Reinach (CH)

(72) Inventors: Hao Zhu, Freising (DE); Rémy Scherrer, Oberdorf (FR)

(73) Assignee: Endress+Hauser Flowtec AG, Reinach (CH)

( * ) Notice: Subject to any disclaimer, the term of this patent is extended or adjusted under 35 U.S.C. 154(b) by 475 days.

(21) Appl. No.: 16/629,071

(22) PCT Filed: Jun. 19, 2018

(86) PCT No.: PCT/EP2018/066273
§ 371 (c)(1),
(2) Date: Jan. 7, 2020

(87) PCT Pub. No.: WO2019/007679
PCT Pub. Date: Jan. 10, 2019

(65) Prior Publication Data
US 2020/0191632 A1    Jun. 18, 2020

(30) Foreign Application Priority Data
Jul. 7, 2017   (DE) ................... 10 2017 115 251.2

(51) Int. Cl.
*G01F 1/84*    (2006.01)

(52) U.S. Cl.
CPC .......... *G01F 1/8477* (2013.01); *G01F 1/8422* (2013.01); *G01F 1/8427* (2013.01); *G01F 1/8436* (2013.01)

(58) Field of Classification Search
CPC .... G01F 1/8477; G01F 1/8422; G01F 1/8427; G01F 1/8436
See application file for complete search history.

(56) References Cited

U.S. PATENT DOCUMENTS

| 5,555,190 A | 9/1996 | Derby et al. |
| 6,318,156 B1 * | 11/2001 | Dutton .................. G01N 9/002 |
| | | 73/861.04 |

(Continued)

FOREIGN PATENT DOCUMENTS

| CN | 105865555 A | 8/2016 |
| DE | 102010003948 A1 | 10/2011 |

(Continued)

OTHER PUBLICATIONS

Endress+Hauser Flowtec AG, E+H Flow Handbook, 3rd edition, 2006 (Year: 2006); provided by Applicant on Jun. 29, 2023.*

*Primary Examiner* — John Fitzgerald
*Assistant Examiner* — Rodney T Frank
(74) *Attorney, Agent, or Firm* — Mark A. Logan; Endress+Hauser (USA) Holding, Inc.

(57) ABSTRACT

Disclosed is a measurement pickup for determining the mass flow rate of a liquid comprising: at least one measurement tube for carrying the liquid having an inlet-side end section and an outlet-side end section; a support body on which the measurement tube is mounted an exciter for exciting vibrations of the measurement tube; at least one vibration sensor for detecting vibrations of the measurement tube; an operating and evaluation circuit for driving the exciter, for receiving the signals of the vibration sensor, and for ascertaining a measured value representing the mass flow rate. The operating and evaluation circuit comprises an adaptive low-pass filter for filtering the sequence of measured values representing the mass flow rate, wherein the low-pass filter has at least one filter parameter dependent on at least one adaptive controlled variable that, for its part, is dependent on the gas content of the test medium.

11 Claims, 2 Drawing Sheets

(56) References Cited

U.S. PATENT DOCUMENTS

| | | | | |
|---|---|---|---|---|
| 6,389,364 | B1* | 5/2002 | Vyers | G05D 7/0635 |
| | | | | 702/45 |
| 2005/0274200 | A1 | 12/2005 | Henry et al. | |
| 2008/0243400 | A1* | 10/2008 | Bell | G01F 15/024 |
| | | | | 702/45 |
| 2017/0254688 | A1* | 9/2017 | Patten | G01F 1/8436 |

FOREIGN PATENT DOCUMENTS

| | | |
|---|---|---|
| EP | 1363108 A2 | 12/2002 |
| WO | 0104716 A1 | 1/2001 |
| WO | 2007022118 A1 | 2/2007 |
| WO | 2007035376 A2 | 3/2007 |

\* cited by examiner

MEASUREMENT PICKUP FOR DETERMINING THE MASS FLOW RATE OF A LIQUID

CROSS-REFERENCE TO RELATED APPLICATIONS

The present application is related to and claims the priority benefit of German Patent Application No. 10 2017 115 251.2, filed on Jul. 7, 2017, and International Patent Application No. PCT/EP2018/066273, filed on Jun. 19, 2018, the entire contents of which are incorporated herein by reference.

TECHNICAL FIELD

The present invention relates to a measurement pickup for determining the mass flow rate of a liquid, comprising: at least one measurement tube for carrying the liquid, wherein the measurement tube has an inlet-side end section and an outlet-side end section; at least one support body on which the measurement tube is mounted in the region of the inlet-side end section and in the region of the outlet-side end section; at least one exciter for exciting vibrations of the measurement tube in at least one vibration mode; at least one vibration sensor for detecting the vibrations of the measurement tube and for outputting vibration-dependent signals; an operating and evaluation circuit for driving the at least one exciter, for receiving the vibration-dependent signals of the vibration sensor, and for ascertaining a measured value representing the mass flow rate as a function of at least the vibration-dependent signals of the sensor.

BACKGROUND

Published patent application DE 10 2010 003 948 A1 describes a generic measurement pickup and its operating procedure, for example.

The processing of the vibration-dependent signals, which, for example, takes place for evaluations, for control applications, for visual representation, for documentation purposes, etc., is increasingly carried out digitally. In the process, the varying vibration-dependent signals are initially recorded analogously. In a known manner, such analog signals can be sampled by sampling at a high sampling frequency and converted into a time-discrete, one-dimensional measurement signal having a sequence of temporally successive measured values. However, the measurement signal obtained in this way has a noise which can be pronounced to different degrees as a result of the varying properties of the liquid flowing in the measurement tube, for example as a result of the level of gas content. It is known to filter the measurement signal by means of a low-pass filter, which is however accompanied by a reduction of the data rate. The reduction of the data rate is problematic in particular in time-critical applications if a superordinate unit, for example a process control unit or process monitoring unit, has to be informed as promptly as possible about occurring changes in the mass flow rate.

It is known to suppress the noise with adaptive filters, but these filters are controlled as a function of the noise of the measured variable. However, this may result in a delayed adaptation of the filter to changed measurement conditions, in particular when media properties, such as a gas content of a liquid, change suddenly.

SUMMARY

The object of the present invention is, therefore, to find a remedy.

The measurement pickup according to the invention for determining the mass flow rate of a liquid comprises:
- at least one measurement tube for carrying the liquid, wherein the measurement tube has an inlet-side end section and an outlet-side end section;
- at least one support body on which the measurement tube is mounted in the region of the inlet-side end section and in the region of the outlet-side end section;
- at least one exciter for exciting vibrations of the measurement tube in at least one vibration mode;
- at least two vibration sensors for detecting vibrations of the measurement tube and for outputting vibration-dependent signals;
- an operating and evaluation circuit for driving the at least one exciter, for receiving the vibration-dependent signals of the vibration sensors, and for ascertaining a sequence of measured values representing a respective mass flow rate as a function of at least one sequence of time-discrete measurement signals each representing a phase difference between the vibration-dependent signals of the vibration sensors, and
- wherein the operating and evaluation circuit comprises an adaptive low-pass filter for filtering the sequence of the measured values representing the mass flow rate; wherein the low-pass filter has at least one filter parameter dependent on at least one adaptive control variable that, for its part, depends on the gas content of the measured medium.

In a development of the invention, the control variable is independent of the mass flow rate.

In a development of the invention, the control variable depends on a signal representing the level of the gas content.

In a development of the invention, the operating and evaluation circuit is designed to ascertain the control variable as a function of a gas-content-dependent fluctuation of a natural frequency of the measurement tube vibration.

In a development of the invention, the operating and evaluation circuit is designed to ascertain the control variable as a function of a gas-content-dependent damping of the measurement tube vibrations.

In a development of the invention, the operating and evaluation circuit is designed to ascertain the control variable as a function of a gas-content-dependent damping fluctuation of the measurement tube vibrations.

In a development of the invention, the low-pass filter comprises an adaptive filter, wherein the control variable has a weighting function with which a current, preliminary measured value contributes to a measured value to be output, wherein the weighting function depends on a current weighting time constant, which is ascertained as a function of the gas content, wherein the weighting function $k_m(\tau)$ is a function that decreases monotonously with an increasing weighting time constant $\tau$, in particular a function of the reciprocal value of the time constant, for example of the type $k_m(\tau)=(1-\exp(-(t/\tau))$, where t is the period between two preliminary measured values.

In a development of the invention, the operating and evaluation circuit is designed to first ascertain a time constant trend value $\tau_s$ as a function of current signals dependent on the gas content, to compare a last valid weighting time constant $\tau_{i-1}$ with the time constant trend value $\tau_s$, to increase the value in comparison to the last weighting time constant $\tau_{i-1}$ in order to ascertain a current weighting time constant $\tau_i$ when the last valid weighting time constant $\tau_{i-1}$ is less than the time constant trend value $\tau_s$, and to reduce the value in comparison to the last weighting time constant $\tau_{i-1}$ when the last valid weighting time constant $\tau_{i-1}$ is greater than the time constant trend value $\tau_s$.

In a development of the invention, the following applies to the case of a weighting time constant to be increased: $(\tau_i - \tau_{i-1})/t = a$, where t is the time interval between two successive measured values, and a is a constant which is not more than 8, in particular not more than 4, and preferably not more than 2.

In a development of the invention, the following applies to the case of time constants to be reduced:

$\tau_i/\tau_{i-1} = b$, where $0.9 < b < 1$, in particular $0.95 < b < 1$, preferably $0.975 < b < 1$.

In a development of the invention, the operating and evaluation circuit is designed to ascertain the time constant trend value $\tau_s$ as a function of the fluctuation of the natural frequency of the measurement tube vibration normalized with the square of the natural frequency.

In a development of the invention, the operating and evaluation circuit is designed to ascertain the time constant trend value $\tau_s$ as follows:

$$\tau_{s,i} = X \cdot k_\tau \cdot \left( \frac{|f_i - f_{i-1}|}{f_i^2} \right) + (1 - k_\tau) \cdot \tau_{s,i-1},$$

or:

$$\tau_{s,i} = X \cdot \left( \frac{FFD_i}{FD_i^2} \right),$$

where:

$$FFD_i = k_{FF} \cdot |f_i - f_{i-1}| + (1 - k_{k_{FF}}) \cdot FFD_{i-1},$$

and:

$$FD_i = k_F \cdot f_i + (1 - k_F) \cdot FD_{i-1},$$

where X is a constant, $f_i$ is a current natural frequency of a measurement tube vibration, and $k_\tau$, $k_{FF}$, $k_F$, are weighting factors, in particular constant weighting factors.

According to one embodiment of the invention, a current filtered measured value of the mass flow rate $\dot{m}_{f,i} = \dot{m}_f(t_i)$ is ascertained by a weighted addition of the current unfiltered measured value of the mass flow rate $\dot{m}_i = \dot{m}(t_i)$, to the previous filtered measured value of the mass flow rate $\dot{m}_{f,i-1} = \dot{m}_f(t_{i-1})$, that is to say:

$$\dot{m}_{f,i} := k_m(\tau_i) \cdot \dot{m}_i + (1 - k_m(\tau_i)) \cdot \dot{m}_{f,i-1},$$

where $k_m(\tau_i)$ is a sequence of gas-content-dependent weighting factors, which were ascertained in the previously described manner.

BRIEF DESCRIPTION OF THE DRAWINGS

The invention is now described in further detail on the basis of an exemplary embodiment shown in the drawings. They show.

DETAILED DESCRIPTION

Figure 1A:
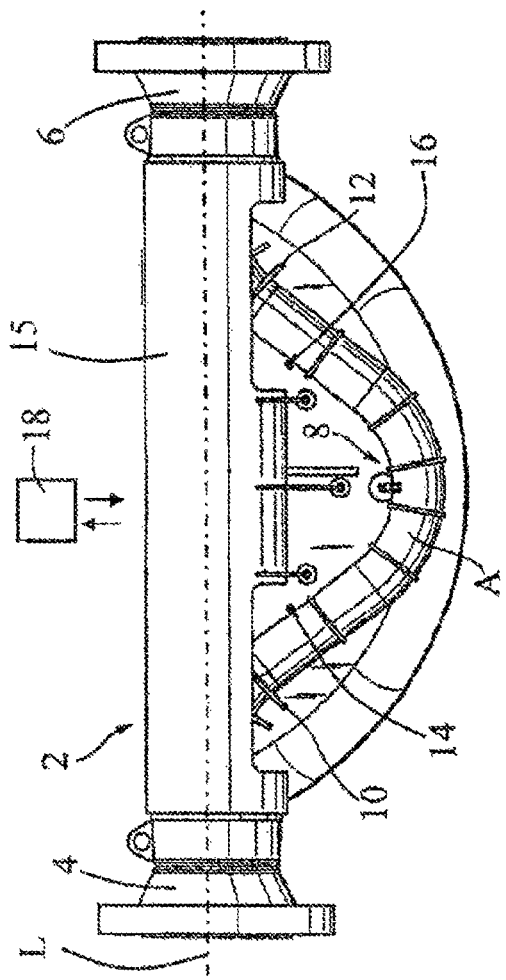
FIG. 1a shows an illustration of an exemplary embodiment of a mass flow measuring device having two measurement tubes in side view with a partially removed housing.
Figure 1B:
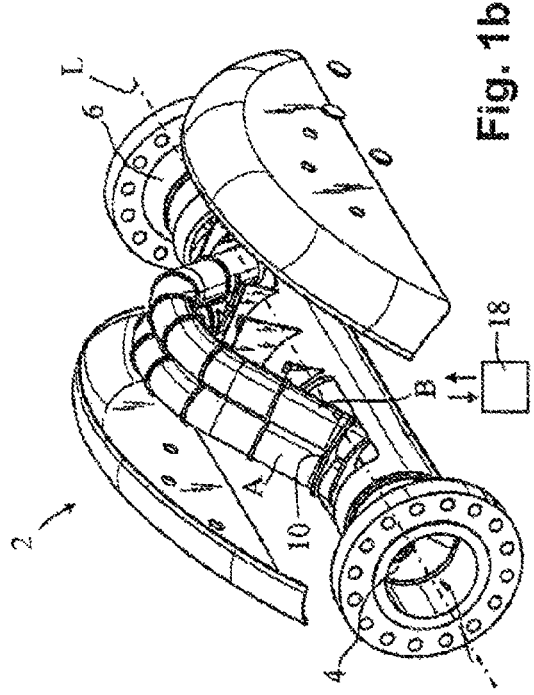
FIG. 1b shows the mass flow measuring device of FIG. 1 in a perspective view with a partially removed housing.

FIGS. 1a and 1b show, by way of example, a mass flow measuring device 2 with a longitudinal axis L, which mass flow measuring device operates according to the Coriolis principle and is designed according to the present invention. The method according to the invention can in particular be carried out by this mass flow measuring device 2. The mass flow measuring device 2 has two vibratorily mounted measurement tubes A and B, which respectively have an arcuate shape and extend in parallel to one another. The mass flow measuring device 2 can be inserted into a pipeline (not shown) in such a way that the fluid flowing in the pipeline flows through the two measurement tubes A and B. Flow dividers and flow collectors 4, 6 are respectively provided on the inlet side and on the outlet side of the measurement tubes A and B.

An exciter 8 is arranged between the two measurement tubes A and B. In the present embodiment, the exciter 8 is positioned at a reversal point of the arc formed by the two measurement tubes A and B in each case. The two measurement tubes A and B can be periodically deflected in relation to one another by the exciter 8 so that they execute bending vibrations. The two measurement tubes A and B are also mechanically coupled to one another on the inlet side and on the outlet side by corresponding coupling elements 10, 12.

Two vibration sensors 14, 16 respectively extend between the two measurement tubes A and B at an inlet-side and at an outlet-side section thereof. In the present embodiment, the two vibration sensors 14, 16 can each detect the change in distance between the two measurement tubes A, B, i.e., their combined amplitude. The vibration sensors 14, 16 each output a sensor voltage as a function of the vibrations of the measurement tubes A and B. This is initially an analog measurement signal in each case. Excitation of the exciter 8 by application of a corresponding excitation voltage and processing and evaluation of the analog measurement signals provided by the vibration sensors 14, 16 takes place by a correspondingly designed operating and evaluation circuit 18, which is shown in FIGS. 1 and 2 only schematically by a box.

A phase difference $\Delta\varphi(t)$ of the vibrations of the two measurement tubes A, B between the two measuring points formed by the vibration sensors 14, 16 is to be determined in order to ascertain measured values of the mass flow rate $\dot{m}(t)$. The mass flow rate of the fluid flowing in the pipeline can be determined in particular, as is known to the person skilled in the art, from this phase difference $\Delta\varphi(t)$ as follows:

$$\dot{m}(t) := k \cdot \tan(\Delta\varphi(t)/2)/(2\pi \cdot f),$$

where k is a constant specific to the respective measuring device, and f describes the current vibration frequency of the measurement tubes.

In order to determine a sequence $\Delta\varphi_i = \Delta\varphi(t_i)$ of discrete values of the phase difference $\Delta\varphi(t)$, the operating and evaluation circuit 18 respectively determines, from the analog measurement signals provided by the vibration sensors

14, 16, the phase information $\varphi_1(t_i)$, $\varphi_2(t_i)$ of the vibration of the two measurement tubes A, B at the measuring points formed by the two vibration sensors 14, 16. For this purpose, in particular the analog measurement signal, which is respectively provided by the vibration sensors 14, 16 and is generally formed by a sensor voltage corresponding to the vibrations, can be sampled at a high sampling frequency, for example at 40 kHz. As a result, a time-discrete, one-dimensional measurement signal having a temporal sequence of measured values is obtained. As a rule, the individual measured values of the sequence are also quantized in order to enable digital processing. Furthermore, in the present embodiment, each measurement signal is converted into an analytical signal consisting of a real part $R(t_i)$ and an imaginary part $I(t_i)$. For this purpose, two filters having a phase difference of 90° may, for example, be used in parallel in a known manner. Furthermore, the present embodiment provides that the data rate of the analytical signal is reduced. This can be done, for example, via corresponding decimation stages. From the analytic signal, as is familiar to the person skilled in the art, (time-dependent) amplitude information $A_1(t_i)$, $A_2(t_i)$ and (time-dependent) phase information $\varphi_1(t_i)$, $\varphi_2(t_i)$ of the vibration of the two measurement tubes A, B can respectively be obtained at the respective measuring point. The phase difference $\Delta\varphi_i=\Delta\varphi(t_i)$ between the two measuring points formed by the vibration sensors 14, 16 can be obtained by forming the difference of the phase information $\varphi_1(t_i)$, $\varphi_2(t_i)$ of the vibrations detected by the two vibration sensors 14, 16. Since the signal processing in the present embodiment takes place largely digitally, the respective processed measurement signals are time-discrete so that specific instants $t_i$ are referred to in each case.

The operating and evaluation circuit as a rule evaluates the amplitude information $A_1(t_i)$, $A_2(t_i)$ and the phase information $\varphi_1(t_i)$, $\varphi_2(t_i)$. In particular, the excitation of the measurement tubes A, B by the exciter 8 is controlled in each case as a function of these variables.

The operating and evaluation circuit is further designed to determine, from the sequence of time-discrete phase difference values $\Delta\varphi_i$, a corresponding sequence of measured values of the mass flow rate through the pipeline $\dot{m}_i$ as follows:

$$\dot{m}_i := k \cdot \tan(\Delta\varphi_i/2)/(2\pi \cdot f_i),$$

where $\dot{m}_i := m(t_i)$, $\Delta\varphi_i = \Delta\varphi(t_i)$, and $f_i = f(t_i)$.

Other signal processing or digital or analog signal processing alternative to the above-explained signal processing, such as amplification, zero point compensation, etc., can also be performed in order to provide the sequence of measured values of the mass flow rate $\dot{m}_i$. This can take place both before and after the signal processing described below with an adaptive filter.

Figure 2B:
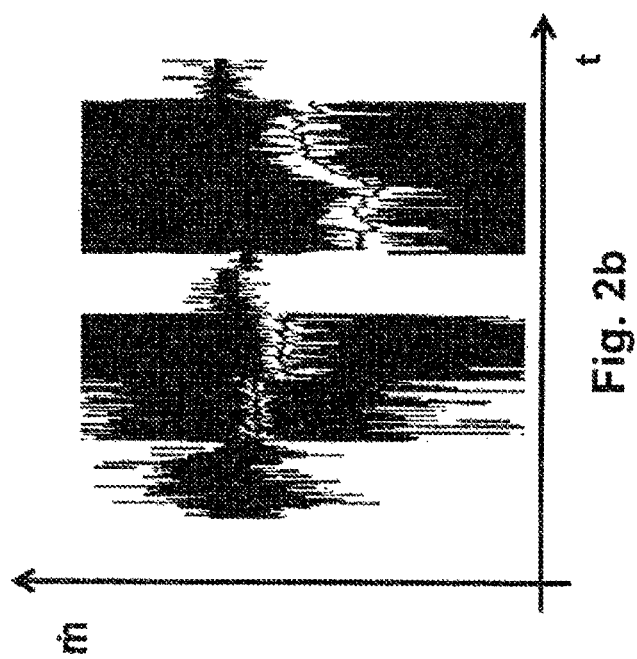
FIG. 2b shows an illustration enlarged in comparison to FIG. 2a of mass flow measured values as a function of the gas content.
Figure 2A:
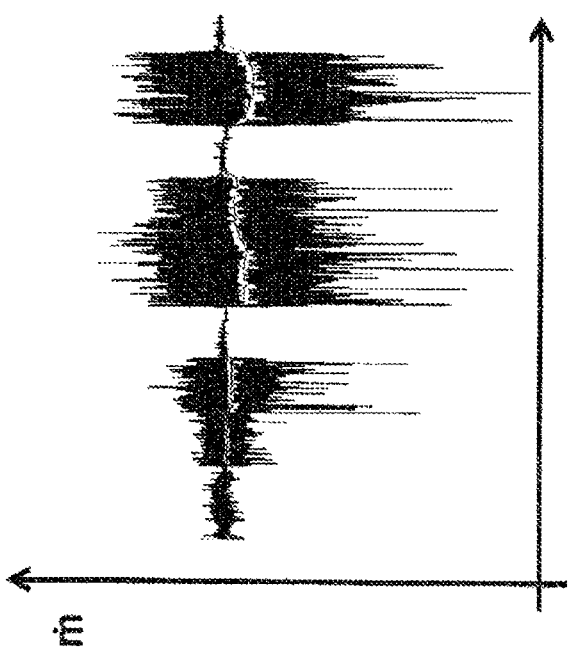
FIG. 2a shows mass flow measured values as a function of the gas content in the unfiltered state, filtered with a conventional filter and filtered with the adaptive filter of the mass flow measurement pickup according to the present disclosure.

The sequence of measured values of the mass flow rate $\dot{m}_i$, or measured values for short, is, in particular with fluctuating gas content of a measured medium flowing in the pipeline, subject to differently strong fluctuations, as shown in FIGS. 2a and 2b, wherein FIG. 2b shows a section with higher resolution. The figures first show unfiltered mass flow measured values. Depending on the gas content, the measured values fluctuate to such an extent that a specific measured value can hardly be identified. The narrower, light-colored band in the middle shows the associated measured value profile on the basis of a conventional low-pass filtering of the measured values. In this respect, it becomes clear, in particular on the basis of the section in FIG. 2b, that these filtered data also have considerable fluctuations. The dark line extending within the light-colored band shows the result of the measured value processing by means of the adaptive filter of the mass flow measuring device according to the invention. It can be seen that the signal has significantly lower fluctuations and can nevertheless follow the actual measured value profile at least as well as the signal processed with a constant filter.

The effective operating principle of the adaptive filter is made possible by controlling a filter parameter as a function of variables which are independent of the phase difference measurement signal, as explained in more detail below.

For operation, the adaptive filter requires a current time constant $\tau_i := \tau(t_i)$, which in the present exemplary embodiment is ascertained as a function of the fluctuation of the vibration frequency of the measurement tube vibrations. Wherein the fluctuation, for its part, is also detected via a filter in order to avoid excessive changes in the time constant.

In this case, a current time constant trend value $\tau_{s,i}$ is first ascertained, to which a last valid time constant is compared. If the time constant trend value is greater than the last valid time constant $\tau_{i-1}$ by more than a tolerance value, a currently valid time constant $\tau_i$ with a value greater than that of the last valid time constant is ascertained. If the time constant trend value is smaller than the last valid time constant $\tau_{i-1}$, a currently valid time constant $\tau_i$ with a value smaller than that of the last valid time constant is ascertained.

In this exemplary embodiment, the current time constant trend value $\tau_{s,i}$ is ascertained on the basis of the fluctuation of the frequency of the measurement tube vibrations, which is normalized with the square of this frequency. Specifically, the filter uses the following equation:

$$\tau_{s,i} = k_{\tau s} \cdot X \cdot \left(\frac{|f_i - f_{i-1}|}{f_i^2}\right) + (1 - k_{\tau s}) \cdot \tau_{s,i-1}$$

The weighting factor $k_{\tau s}$ with which a current frequency fluctuation contributes to the current time constant trend value is a few % and can be ascertained as:

$$k_{\tau s} = (1 - \exp(-t_s/\tau_k)),$$

where $t_s$ is the measurement interval, that is to say the time between two frequency measured values, for example 20 ms. $\tau_K$ is a defined time constant which is a multiple of $t_s$, for example $0.5\ \mathrm{s} < \tau_k < 2\ \mathrm{s}$, in particular $\tau_k = 1\ \mathrm{s}$.

The factor X is a constant having a value between 10 and 200, for example 50.

When the thus-ascertained time constant trend value $\tau_{s,i}$ is greater than the sum of the last valid weighting time constant $\tau_{i-1}$ and a tolerance value, which, for example, corresponds to half a measurement interval $t_s$, the weighting time constant is increased, for example by addition of a constant time increment, which corresponds to a measurement interval $t_s$, for example 20 ms.

If, on the other hand, the time constant trend value $\tau_{s,i}$ is less than the last valid weighting time constant $\tau_{i-1}$, the latter is multiplied by a factor $b<1$ in order to ascertain a current weighting time constant $\tau_i$, i.e., $\tau_i = b \cdot \tau_{i-1}$, where: $0.9 < b < 1$, in particular $0.95 < b < 1$, preferably $0.975 < b < 1$.

Figure 3:
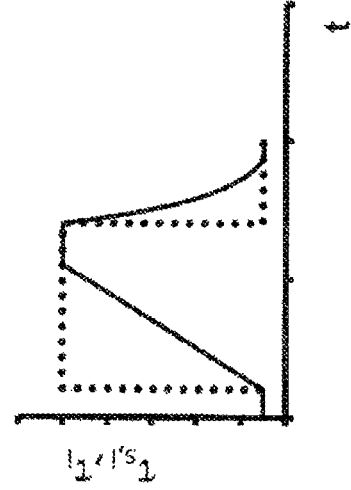
FIG. 3 shows measured values of a mass flow measuring device according to the invention in the filtered and unfiltered state.

The combination of increases in the weighting time constant by addition of a moderate increment with a reduction by multiplication by a factor <1 has the effect on the one hand that the weighting time constant increases relatively quickly with occurring gas contents starting from small values, but that it then, in contrast to a sequence of multiplications, does not increase exponentially without bounds, and that on the other hand the weighting time constant decreases exponentially as the gas content decreases so that the measured value ascertainment can be adapted quickly to the more favorable conditions. An example of a jump response of the weighting time constant to a jump of the time constant trend value is shown in FIG. 3. Herein, the dotted line shows a jump of the time constant trend value $\tau_{s,i}$ of, for example, 1 s to 10 s and back, while the solid line illustrates the reaction of the weighting time constant $\tau_i$.

The weighting time constant $\tau_i$ contributes to the ascertainment of a weighting factor $k_m(\tau_i)$ for ascertaining a filtered measured value as follows:

$k_m(\tau_i)=(1-\exp(-(t_s/\tau_i))$, where $t_s$ is again the measurement interval. A current, filtered measured value $\dot{m}_{f,i}=\dot{m}_f(t_i)$ is ascertained by a weighted addition of the currently unfiltered measurement signal $\dot{m}_i=\dot{m}(t_i)$ to the previous filtered measurement signal $\dot{m}_{f,i-1}=\dot{m}_f(t_{i-1})$, i.e.:

$$\dot{m}_{f,i}=k_m(\tau_i)\cdot\dot{m}_i+(1-k_m(\tau_i))\dot{m}_{f,i-1}.$$

As shown in FIGS. 2a and 2b, this leads to a significantly improved damping of the fluctuations of the mass flow measured values.

If the frequency fluctuations are used to ascertain the time constant trend value, the current frequency fluctuations and their normalizing frequency value contribute, as described above, with a weighting factor $k_{\tau_s}$ to the time constant trend value, which is the function of a time constant.

Since the relative fluctuations of the fluctuations of the frequency are significantly greater than the relative fluctuations of the frequency, it may be expedient to use a larger time constant for the fluctuations than for the normalizing frequency. As shown in the following embodiment.

$$\tau_{s,i} = X \cdot \left(\frac{FFD_i}{FD_i^2}\right),$$

where:

$$FFD_i = k_{FF} \cdot |f_i - f_{i-1}| + (1 - k_{FF}) \cdot FFD_{i-1},$$

and:

$$FD_i = k_F \cdot f_i + (1 - k_F) \cdot FD_{i-1},$$

where X is a constant, $f_i$ is a current natural frequency of a measurement tube vibration, and $k_{FF}$, $k_F$, are weighting factors, in particular constant weighting factors, where:

$k_{FF} < k_F$.

This ensures that a faster adaptation of the adaptive filter to an actually changing vibration frequency of the measurement tubes takes place.

Instead of the fluctuations of the vibration frequency of the measurement tubes, the damping of the vibration amplitudes $A_1(t_i)$, $A_2(t_i)$ at the current resonant frequency or the fluctuation of this damping can also be used. The damping $D_i=D(t_i)$ results, for example, from a ratio of a current excitation signal $E_i=E(t_i)$ for exciting the vibrations and, for example, the sum of the amplitudes at resonance, i.e.:

$$D_i=E_i/(A_1(t_i)+A_2(t_i))$$

A normalized current fluctuation of the $FD_i$ damping can be ascertained as follows:

$$FD_i=(D_i-D_{i-1})/D_{i-1}$$

Based on these variables, a time constant trend value, with which the filter is to be controlled as described above, can be determined with appropriate normalizations in accordance with the methods described in connection with the frequency fluctuation.

The invention claimed is:

1. A measurement pickup for determining the mass flow rate of a liquid measured medium, the measurement pickup comprising:
   a measurement tube for carrying the liquid measured medium, wherein the measurement tube has an inlet-side end section and an outlet-side end section;
   a support body on which the measurement tube is mounted in a region of the inlet-side end section and in a region of the outlet-side end section;
   an exciter for exciting vibrations of the measurement tube in at least one vibration mode;
   at least two vibration sensors for detecting vibrations of the measurement tube and for outputting vibration-dependent signals; and
   an operating and evaluation circuit for driving the exciter, for receiving the vibration-dependent signals of the at least two vibration sensors, and for calculating a sequence of mass flow rate measured values as a function of a sequence of time-discrete phase difference values between the vibration-dependent signals of the at least two vibration sensors,
   wherein the operating and evaluation circuit includes an adaptive low-pass filter for filtering the sequence of the mass flow rate measured values,
   wherein the adaptive low-pass filter has a filter parameter dependent on a gas content of the liquid measured medium, and
   wherein the operating and evaluation circuit is designed to calculate the filter parameter as a function of a gas-content-dependent fluctuation of a natural frequency of the measurement tube vibration.

2. The measurement pickup according to claim 1, wherein the filter parameter is independent of the mass flow rate.

3. The measurement pickup according to claim 1, wherein the filter parameter depends on a signal representing the level of the gas content.

4. The measurement pickup according to claim 1,
   wherein the filter parameter includes a weighting function that weights a current, preliminary mass flow rate measured value in determining a filtered mass flow rate measured value to be output,
   wherein the weighting function depends on a current weighting time constant $\tau$ that is a function of the gas content of the liquid measured medium, and
   wherein the weighting function is a function that decreases monotonously with an increasing weighting time constant $\tau$.

5. The measurement pickup according to claim 4, wherein the weighting function is a function of the reciprocal value of the weighting time constant $\tau$, including of the type:

$(1-\exp(-(t/\tau))$, where t is a period between two preliminary measured values.

6. The measurement pickup according to claim 4, wherein the operating and evaluation circuit is designed:
   to first ascertain a time constant trend value $\tau_s$ as a function of current signals dependent on the gas content of the liquid measured medium,
   to compare a last valid weighting time constant $\tau_{i-1}$ with the time constant trend value $\tau_s$,
   to increase the value of the weighting time constant $\tau$ in comparison to the last valid weighting time constant $\tau_{i-1}$ when the last valid weighting time constant $\tau_{i-1}$ is less than the time constant trend value $\tau_s$, and to reduce the value of the weighting time constant $\tau$ in comparison to the last valid weighting time constant $\tau_{i-1}$ when the last valid weighting time constant $\tau_{i-1}$ is greater than the time constant trend value $\tau_s$.

7. The measurement pickup according to claim 6, wherein the following applies to the case of a weighting time constant to be increased: $(\tau_i - \tau_{i-1})/t = a$, where t is a time interval between two consecutive measured values, and a is a constant which is not more than 8.

8. The measurement pickup according to claim 6, wherein the following applies to the case of time constants to be reduced: $\tau_i/\tau_{i-1} = b$, where $0.9 < b < 1$.

9. The measurement pickup according to claim 6, wherein the operating and evaluation circuit is further designed to ascertain the time constant trend value $\tau_s$ as a function of a fluctuation of a natural frequency of the measurement tube vibration normalized with the square of the natural frequency of the measurement tube vibration.

10. The measurement pickup according to claim 9, wherein the operating and evaluation circuit is further designed to ascertain the time constant trend value $\tau_s$ as follows:

$$\tau_{s,i} = X \cdot k_\tau \cdot \left( \frac{|f_i - f_{i-1}|}{f_i^2} \right) + (1 - k_\tau) \cdot \tau_{s,i-1},$$

where X is a constant, $f_i$ is a current natural frequency of a measurement tube vibration, and $k_\tau$, is a constant weighting factor.

11. The measurement pickup according to claim 9, wherein the operating and evaluation circuit is further designed to ascertain the time constant trend value $\tau_s$ as follows:

$$\tau_{s,i} = X \cdot \left( \frac{FFD_i}{FD_i^2} \right),$$

where:

$$FFD_i = k_{FF} \cdot |f_i - f_{i-1}| + (1 - k_{FF}) \cdot FFD_{i-1},$$

and:

$$FD_i = k_F \cdot f_i + (1 - k_F) \cdot FD_{i-1},$$

and where X is a constant, $f_i$ is a current natural frequency of a measurement tube vibration, and $k_{FF}$, and $k_F$ are constant weighting factors.

* * * * *